United States Patent
Tanimoto

(10) Patent No.: US 8,307,100 B2
(45) Date of Patent: *Nov. 6, 2012

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 340 days.

This patent is subject to a terminal disclaimer.

(21) Appl. No.: 12/107,793

(22) Filed: Apr. 23, 2008

(65) Prior Publication Data

US 2008/0281981 A1    Nov. 13, 2008

(30) Foreign Application Priority Data

May 9, 2007 (JP) ................... 2007-124708
Jun. 7, 2007 (JP) ................... 2007-152121

(51) Int. Cl.
G06F 15/16    (2006.01)
(52) U.S. Cl. .......... 709/229; 709/205; 709/225
(58) Field of Classification Search .......... 709/201–203, 709/205, 216, 223–226, 229, 248; 707/10, 707/200–203; 726/26–31
See application file for complete search history.

(56) References Cited

U.S. PATENT DOCUMENTS

| | | | |
|---|---|---|---|
| 6,260,040 B1 * | 7/2001 | Kauffman et al. | 707/10 |
| 6,574,656 B1 | 6/2003 | Nagaoka et al. | |
| 6,765,686 B2 | 7/2004 | Maruoka | |
| 6,898,641 B1 | 5/2005 | Kobayashi | |
| 7,139,780 B2 * | 11/2006 | Lee et al. | 707/204 |
| 7,200,642 B2 * | 4/2007 | Hultgren et al. | 709/217 |
| 7,206,088 B2 | 4/2007 | Tanimoto | |
| 7,206,939 B2 * | 4/2007 | Miyazaki et al. | 713/193 |
| 7,454,402 B2 * | 11/2008 | Spencer et al. | 707/1 |
| 7,647,388 B2 | 1/2010 | Kato | |
| 7,660,809 B2 * | 2/2010 | Cortright et al. | 707/999.102 |
| 8,065,418 B1 | 11/2011 | Abuan et al. | |
| 2002/0059436 A1 | 5/2002 | Kubo | |
| 2002/0143855 A1 | 10/2002 | Traversat et al. | |
| 2002/0143956 A1 | 10/2002 | Tanimoto | |

(Continued)

FOREIGN PATENT DOCUMENTS

JP    04-105143 A    4/1992

(Continued)

OTHER PUBLICATIONS

Official communication issued in counterpart Japanese Application No. 2007-152121, mailed on Apr. 20, 2009.

(Continued)

*Primary Examiner* — Brendan Higa
(74) *Attorney, Agent, or Firm* — Keating & Bennett, LLP

(57) ABSTRACT

A relay server is capable of communicating with other relay servers through an external server arranged on a Wide Area Network. The relay server stores information about a registered terminal, information about the relay servers forming a relay group by permitting connection among each other, and information about a resource and a client terminal sharing the resource. When an operation instruction regarding the resource in another terminal is received, the relay server relays the operation instruction from the registered terminal to another relay server. However, when key information is stored in association with the resource, the relay server relays the operation instruction to the other relay server only when a correct key has been entered.

4 Claims, 12 Drawing Sheets

U.S. PATENT DOCUMENTS

| | | | |
|---|---|---|---|
| 2002/0146002 A1 | 10/2002 | Sato | |
| 2002/0156875 A1* | 10/2002 | Pabla | 709/220 |
| 2003/0144872 A1 | 7/2003 | Masui et al. | |
| 2004/0068516 A1* | 4/2004 | Lee et al. | 707/103 Y |
| 2004/0078426 A1 | 4/2004 | Nagami et al. | |
| 2004/0139400 A1* | 7/2004 | Allam et al. | 715/526 |
| 2004/0148432 A1 | 7/2004 | Udono et al. | |
| 2004/0172395 A1 | 9/2004 | Edelstein et al. | |
| 2004/0243703 A1* | 12/2004 | Demmer et al. | 709/224 |
| 2005/0076098 A1 | 4/2005 | Matsubara et al. | |
| 2005/0240773 A1* | 10/2005 | Hilbert et al. | 713/182 |
| 2006/0083171 A1 | 4/2006 | Tanaike et al. | |
| 2006/0256771 A1 | 11/2006 | Yarlagadda | |
| 2006/0282540 A1 | 12/2006 | Tanimoto | |
| 2007/0050362 A1* | 3/2007 | Low et al. | 707/8 |
| 2007/0233844 A1 | 10/2007 | Tanimoto | |
| 2007/0274329 A1 | 11/2007 | Takeyoshi et al. | |
| 2008/0089349 A1 | 4/2008 | Tanimoto | |
| 2008/0137672 A1 | 6/2008 | Tanimoto | |
| 2008/0288591 A1* | 11/2008 | Tanimoto | 709/205 |
| 2008/0298367 A1 | 12/2008 | Furukawa | |
| 2009/0164636 A1* | 6/2009 | Tanimoto | 709/226 |

FOREIGN PATENT DOCUMENTS

| | | |
|---|---|---|
| JP | 7-121422 A | 5/1995 |
| JP | 09-168055 A | 6/1997 |
| JP | 09-282216 A | 10/1997 |
| JP | 10-154118 A | 6/1998 |
| JP | 11-212871 A | 8/1999 |
| JP | 2000-059465 A | 2/2000 |
| JP | 2001-092702 A | 4/2001 |
| JP | 2001-292167 A | 10/2001 |
| JP | 2001-306382 A | 11/2001 |
| JP | 2002-007182 A | 1/2002 |
| JP | 2002-149519 A | 5/2002 |
| JP | 2002-199150 A | 7/2002 |
| JP | 2002-217943 A | 8/2002 |
| JP | 2002-247036 A | 8/2002 |
| JP | 2002-288415 A | 10/2002 |
| JP | 2002-314573 A | 10/2002 |
| JP | 2003-032310 A | 1/2003 |
| JP | 2004-139291 A | 5/2004 |
| JP | 2004-201255 A | 7/2004 |
| JP | 2004-215135 A | 7/2004 |
| JP | 2004-265415 A | 9/2004 |
| JP | 2004-310371 A | 11/2004 |
| JP | 2004-362166 A | 12/2004 |
| JP | 2005-027040 A | 1/2005 |
| JP | 2005-086520 A | 3/2005 |
| JP | 2005-115943 A | 4/2005 |
| JP | 2005-267658 A | 9/2005 |
| JP | 2005-328239 A | 11/2005 |
| JP | 2006-033105 A | 2/2006 |
| JP | 2006-268138 A | 10/2006 |
| JP | 2006-343943 A | 12/2006 |
| JP | 2007-74035 A | 3/2007 |
| JP | 2007-86910 A | 4/2007 |
| JP | 2007-104440 A | 4/2007 |
| JP | 2007-265135 A | 10/2007 |
| JP | 2007-267136 A | 10/2007 |
| JP | 2008-098699 A | 4/2008 |
| JP | 2008-098888 A | 4/2008 |
| JP | 2008-148046 A | 6/2008 |
| JP | 2008-148125 A | 6/2008 |
| JP | 2008-148200 A | 6/2008 |
| JP | 2008-154101 A | 7/2008 |
| JP | 2008-306500 A | 12/2008 |
| JP | 2009-027652 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |
| JP | 2010-178089 A | 8/2010 |
| JP | 2011-055452 A | 3/2011 |
| JP | 2011-055453 A | 3/2011 |
| JP | 2011-055454 A | 3/2011 |
| WO | 2006/090465 A1 | 8/2006 |

OTHER PUBLICATIONS

Official communication issued in counterpart Japanese Application No. 2007-152121, mailed on Jan. 26, 2009.
Tanimoto: "Relay-Server," U.S. Appl. No. 11/853,943, filed Sep. 12, 2007.
Tanimoto: "File Server Device," U.S. Appl. No. 11/862,654, filed Sep. 27, 2007.
Tanimoto: "File Transfer Server," U.S. Appl. No. 11/870,622, filed Oct. 11, 2007.
Tanimoto: "Relay Server, Relay Communication System, and Communication Device," U.S. Appl. No. 11/944,495, filed Nov. 23, 2007.
Tanimoto: "Relay Server and Client Terminal," U.S. Appl. No. 11/953,351, filed Dec. 10, 2007.
Tanimoto: "Relay Server and Relay Communication System," U.S. Appl. No. 11/953,505, filed Dec. 10, 2007.
Tanimoto: "Relay Server and Relay Communication System," U.S. Appl. No. 12/103,933, filed Apr. 16, 2008.
Tanimoto: "Relay Server and Relay Communication System," U.S. Appl. No. 12/112,127, filed Apr. 30, 2008.
Official communication issued in counterpart European Application No. 08007529.4, mailed on Sep. 15, 2008.
Traversat et al.: "Project JXTA 2.0 Super-Peer Virtual Network," XP-002481407; Project JXTA Sun Microsystems, Inc.; http://research.sun.com/spotlight/misc/jxta.pdf; May 25, 2003; pp. 1-20.
Tanimoto: "Relay Server and Relay Communication System," U.S. Appl. No. 12/335,642, filed Dec. 16, 2008.
Tanimoto: "Relay Server and Relay Communication System," U.S. Appl. No. 12/335,661, filed Dec. 16, 2008.
Tanimoto: "Relay Server and Relay Communication System," U.S. Appl. No. 12/340,868, filed Dec. 22, 2008.
Shinji Okumura et al., SIP (session initiation protocol), Nikkei Communications, Sep. 22, 2003, pp. 150-158 (partial translation pp. 155-156 (Usable in IM and Presence Notification))..
Tanimoto, "Relay Server and Relay Communication System," U.S Appl. No. 12/270,883, filed Nov. 14, 2008.
Official Communication issued in corresponding Japanese Patent Application No. 2009-205183, mailed on Feb. 3, 2012.
Official Communication issued in corresponding Japanese Patent Application No. 2009-205191, mailed on Feb. 3, 2012.
Official Communication issued in corresponding Japanese Patent Application No. 2009-201775, mailed on Feb. 7, 2012.
Tanimoto, "First Relay Server and Second Relay Server," U.S. Appl. No. 13/255,958, filed Sep. 12, 2011.
English translation of Official Communication issued in corresponding Japanese Patent Application No. 2006-334652, mailed on Jun. 8, 2010.
English translation of Official Communication issued in corresponding Japanese Patent Application No. 2007-152122, mailed on Jun. 2, 2010.
Tanimoto, "Relay Server and Relay Communication System", U.S. Appl. No. 13/061,234, filed Feb. 28, 2011.
Tanimoto, "Relay Server, Relay Communication System, and Communication Apparatus", U.S. Appl. No. 13/061,725, filed Mar. 2, 2011.
Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Hitoshi, "Network World", vol. 9, No. 12, Dec. 1, 2004, pp. 148-150.
Tanimoto, "Relay Server, Communication System and Facsimile System", U.S. Appl. No. 10/045,698, filed Jan. 10, 2002.
Tanimoto, "Relay Server, Communication System and Facsimile System", U.S. Appl. No. 10/045,897, filed Jan. 10, 2002.
Tanimoto, "Relay Server for Relaying Communications Between Network Devices", U.S. Appl. No. 10/114,720, filed Apr. 1, 2002.

Tanimoto, "Relay Server", U.S. Appl. No. 10/114,963, filed Apr. 2, 2002.
Tanimoto, "Relay Server, Network Device, Communication System, and Communication Method", U.S. Appl. No. 10/116,615, filed Apr. 2, 2002.
Tanimoto, "Relay Device and Communication System", U.S. Appl. No. 11/723,466, filed Mar. 20, 2007.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
Tanimoto, "Relay Communication System and First Relay Server," U.S. Appl. No. 13/320,034, filed Nov. 11, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S Appl. No. 13/496,664, filed Mar. 16, 2012.
Tanimoto, "Relay Device and Communication System", U.S. Appl. 13/341,711, filed Dec. 30, 2011.

* cited by examiner

FIG. 6

```
<?xml version="1.0" encoding="Shift_JIS" ?>
<relay-policy policy-id="20061001150032@relay-server1" >
<policy-info>
    <relay-account account="relay-server1@net" name="branch office A" >
        <user-account account="user1A@relay-server1.net" name="terminal1A" group="0001" />
        <user-account account="user1B@relay-server1.net" name="terminal1B" group="0001" />
    </relay-account>
    <relay-account account="relay-server2@net" name="branch office B" >
        <user-account account="user2A@relay-server2.net" name="terminal2A" group="0002" />
        <user-account account="user2B@relay-server2.net" name="terminal2B" group="0002" />
    </relay-account>
    <relay-account account="relay-server3@net" name="branch office C" >
        <user-account account="user3A@relay-server3.net" name="terminal3A" group="0003" />
        <user-account account="user3B@relay-server3.net" name="terminal3B" group="0003" />
    </relay-account>
</policy-info>
</relay-policy>
```

FIG. 7

```
<?xml version="1.0" encoding="Shift_JIS" ?>                                          121
<user-account account="user1A@relay-server1.net" >
  <policy name="projectA" policy-id="20061001150032user1A@relay-server1.net" >       122   123
    <family-account-info>
      <user-account account="user1A@relay-server1.net" />
      <user-account account="user2A@relay-server2.net" />                            124
      <user-account account="user3A@relay-server3.net" />
    </family-account-info>
    <family-resource-info>
      <resource name="projectA-folder" owner="user1A@relay-server1.net"              130
                value="c:/folderA" status="ok" >
        <resource name="file00ZX.xls" owner="user1A@relay-server1.net"               127
                  value="//network/z://folderZ/file001.xls" status="ok" key="key001" />
        <resource name="file00ZY.doc" owner="user1A@relay-server1.net"               127   125
                  value="//network/z://folderZ/file002.doc" status="ok" />           127
      </resource>
    </family-resource-info>
  </policy>
</user-account>
```

RELAY SERVER AND RELAY COMMUNICATION SYSTEM

CROSS-REFERENCE TO RELATED APPLICATIONS

This application claims priority under 35 U.S.C. 119 to Japanese Patent Application No. 2007-124708, filed on May 9, 2007, and Japanese Patent Application No. 2007-152121, filed on Jun. 7, 2007 which applications are hereby incorporated by reference in their entirety.

BACKGROUND OF THE INVENTION

1. Field of the Invention

The present invention primarily relates to a relay server that enables communication between terminals.

2. Description of the Related Art

A communication technique referred to as a Virtual Private Network (VPN) is conventionally known. The VPN is used, for example, for communication over the Internet between terminals connected to a Local Area Network (LAN) of a plurality of branch offices (base points) established in multiple regions. Through the use of the VPN, another LAN in a remote location can be used as if it is a directly connected network.

However, since a system of the above-described type establishes the network virtually, the system tends to be rigid. Therefore, it is not easy to establish a scalable and flexible system. For example, in a conventional communication system, a terminal capable of exchanging data between base points and a terminal incapable of such exchange cannot be selectively set at each base point.

Moreover, when a resource, such as a file, is shared with a base point in a remote location, the base point in the remote location may mishandle the file, causing unintended alteration and/or loss of the file.

In order to prevent such erroneous operations due to mishandling of the file, a method of locking the file with a password, for example, can be used. However, this method can be used only when a file in a file format that can be locked with a password is shared, and a simple text file, for example, cannot be locked with a password. Accordingly, the unintended alteration and/or loss of the file cannot be prevented in all cases.

SUMMARY OF THE INVENTION

In order to overcome the problems described above, preferred embodiments of the present invention provide a relay communication system in which a resource can be shared with and/or used by terminals. Moreover, the preferred embodiments of the present invention provide a configuration that prevents, regardless of a file format, unintended alteration and/or loss of the shared resource caused by mishandling of the files.

The problems to be solved by preferred embodiments of the present invention are as described above, and the methods for solving such problems and the effects thereof will be described below.

According to a first preferred embodiment of the present invention, a relay server is provided with the following configuration. The relay server includes an account information registering unit, a relay group information registering unit, and a shared resource information registering unit. The account information registering unit stores account information on a client terminal. The relay group information registering unit stores relay group information including information on a group of relay servers that permits connections among the relay servers. The shared resource information registering unit stores shared resource information including resource information and information on the client terminals that share a relevant resource. It is arranged such that key information can be provided in association with the resource in the shared resource information stored in the shared resource information registering unit. When an operation instruction regarding the resource that can be used by another client terminal is received from the client terminal stored in the account information registering unit, the relay server relays the operation instruction regarding the resource based on the relay group information. However, the relay server relays the operation instruction regarding the resource under the condition that, when the key information is described in the resource in the shared resource information, a correct key is specified by the client terminal that is giving the operation instruction.

Thus, the resource can be shared and used between the client terminals stored in the respective account information registering units of different relay servers. Moreover, by setting a different key for each resource, for example, erroneous operations due to mishandling of files can be prevented in advance, thereby achieving highly-convenient resource sharing.

In the relay server, it is preferable to return an error message to the client terminal when an incorrect key is specified in the client terminal that is giving the operation instruction. Accordingly, a user can immediately identify the erroneous operation of the shared resource, thereby improving the convenience of the resource sharing.

According to a second preferred embodiment of the present invention, a relay communication system is provided with the following configuration. The relay communication system includes a plurality of relay servers. Each relay server includes an account information registering unit, a relay group information registering unit, and a shared resource information registering unit. The account information registering unit stores account information on a client terminal. The relay group information registering unit stores relay group information including information about a group of relay servers that permits connections among relay servers. The shared resource information registering unit stores shared resource information including resource information and information about the client terminals that share a relevant resource. It is arranged such that key information can be provided in association with the resource in the shared resource information stored in the shared resource information registering unit. When an operation instruction regarding the resource that can be used by another client terminal is received from the client terminal stored in the account information registering unit, each relay server relays the operation instruction regarding the resource based on the relay group information. However, the relay server relays the operation instruction regarding the resource under the condition that, when the key information is described in the resource in the shared resource information, a correct key is specified in the client terminal that is giving the operation instruction. Thus, the resource in the client terminal stored in the account information registering unit can be indirectly used in the other client terminal by entering the correct key for the resource.

Thus, a relay communication system in which the resource can be shared and used between the client terminals stored in the respective account information registering units of the different relay servers is provided. Moreover, by setting a different key for each resource, for example, erroneous operations due to mishandling of files can be prevented in advance, thereby achieving highly-convenient resource sharing.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 6 illustrates content of relay group information.

FIG. 7 illustrates content of shared resource information.

DETAILED DESCRIPTION OF PREFERRED EMBODIMENTS

Figure 1:
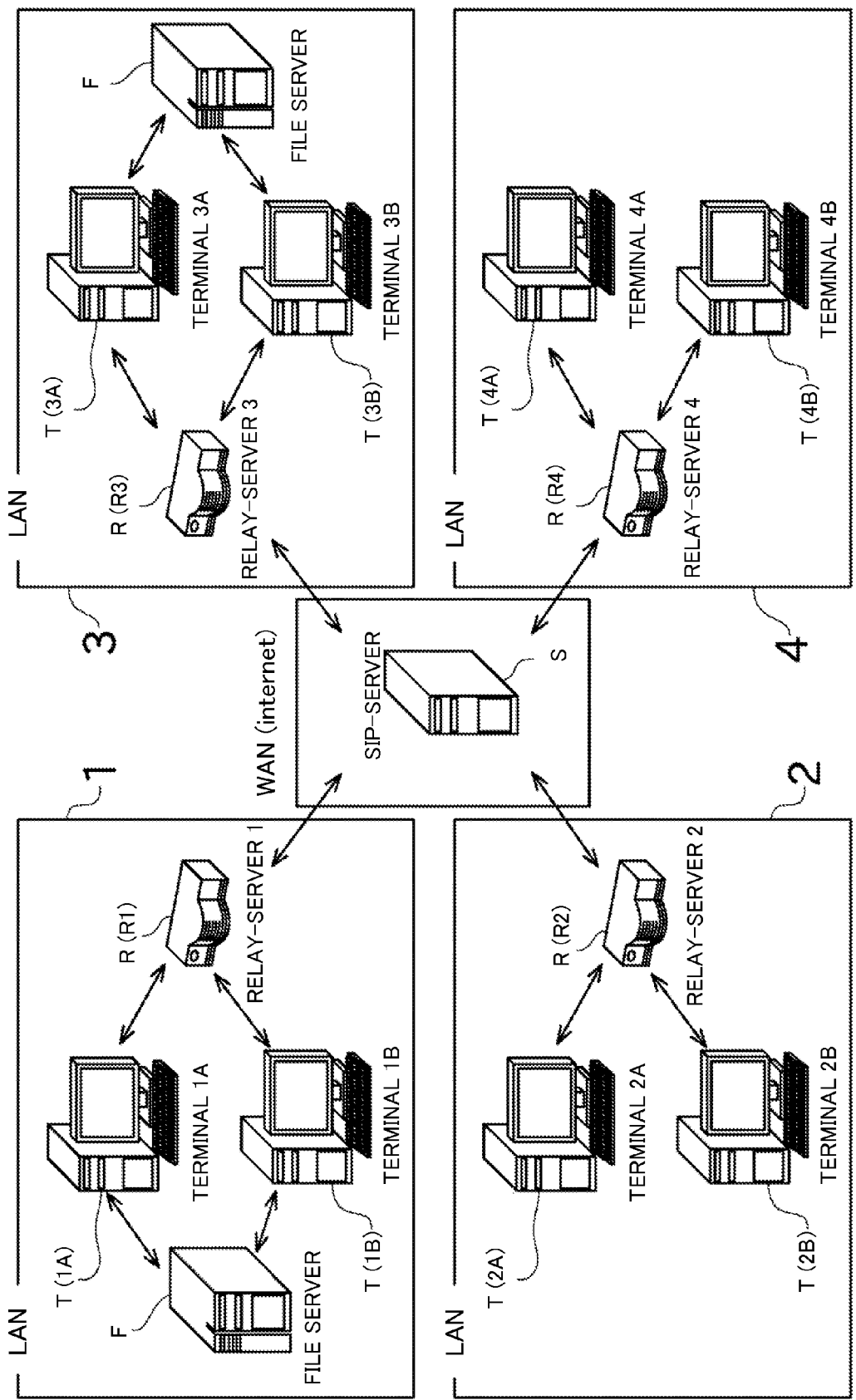
FIG. 1 is a network configuration diagram of a relay communication system according to a preferred embodiment of the present invention.

Preferred embodiments of the present invention will now be described with reference to the drawings. FIG. 1 is a diagram illustrating an overall configuration of a relay communication system according to a preferred embodiment of the present invention.

As illustrated in FIG. 1, the relay communication system includes a plurality of LANs connected to a Wide Area Network (WAN). The relay communication system includes an external server S, a relay server R, a client terminal T, and a file server F.

The WAN is a network that connects different LANs to each other. In the present preferred embodiment, the Internet is preferably used as the WAN.

The LAN is a relatively small-scale network provided in a limited location. A plurality of LANs is provided, each of which is provided at a physically remote location. In the present preferred embodiment, a LAN 1 is provided at a Tokyo branch office, and LANs 2, 3, 4 are respectively provided at an Osaka branch office, a Nagoya branch office, and a Fukuoka branch office. The four LANs 1, 2, 3, and 4 are respectively connected to the Internet, which is a global network.

Figure 2:
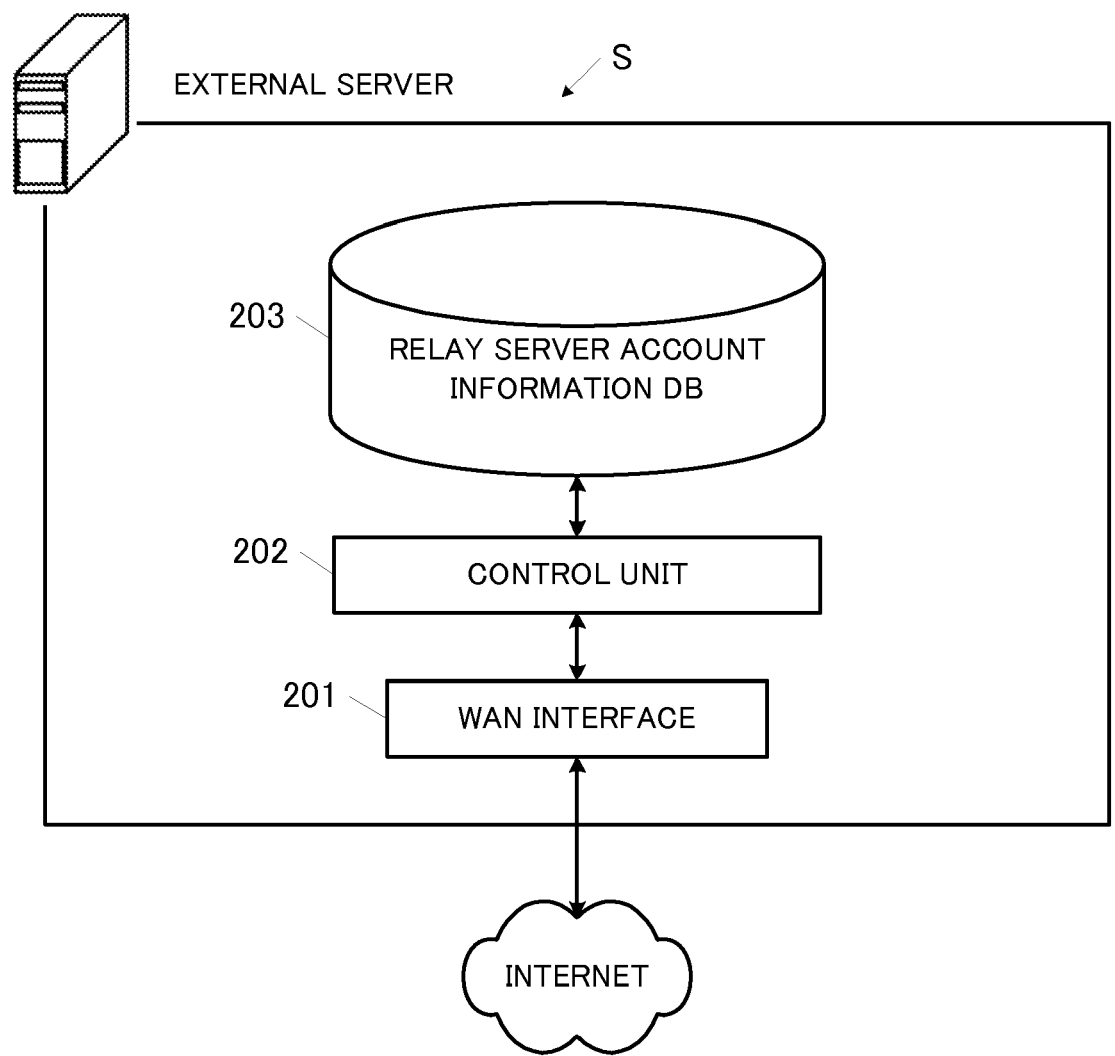
FIG. 2 is a functional block diagram of an external server.

The external server S will now be described with reference to FIG. 2. FIG. 2 is a functional block diagram of the external server S. The external server S is used for the communication between the relay servers R arranged in each LAN, and is installed on the Internet.

The external server S illustrated in FIG. 2 functions as a Session Initiation Protocol (SIP) server. Specifically, the external server S functions as a SIP proxy server for relaying SIP methods and responses, and as an SIP registrar server for registering an account of the relay server R.

As illustrated in FIG. 2, the external server S includes a WAN interface 201, a control unit 202, and a relay server account information database 203.

The WAN interface 201 is an interface that provides communication with each device, such as the relay server R, connected to the Internet, using a global IP address.

The relay server account information database 203 is a database that manages the account of the relay server R that has made a registration request, in association with the global IP address.

The control unit 202 is a processing unit that controls various communications performed through the WAN interface 201, and controls communication processes complying with protocols such as TCP/IP, UDP and SIP. For example, the control unit 202 executes processes such as a process of receiving the account of each relay server R from the relevant relay server R and registering the received account in the relay server account information database 203, and a process of relaying communication data such as various SIP methods and responses transmitted from the relay server R, to another relay server R. The details of each function of the external server S centering on the control unit 202 will be described later.

Figure 3:
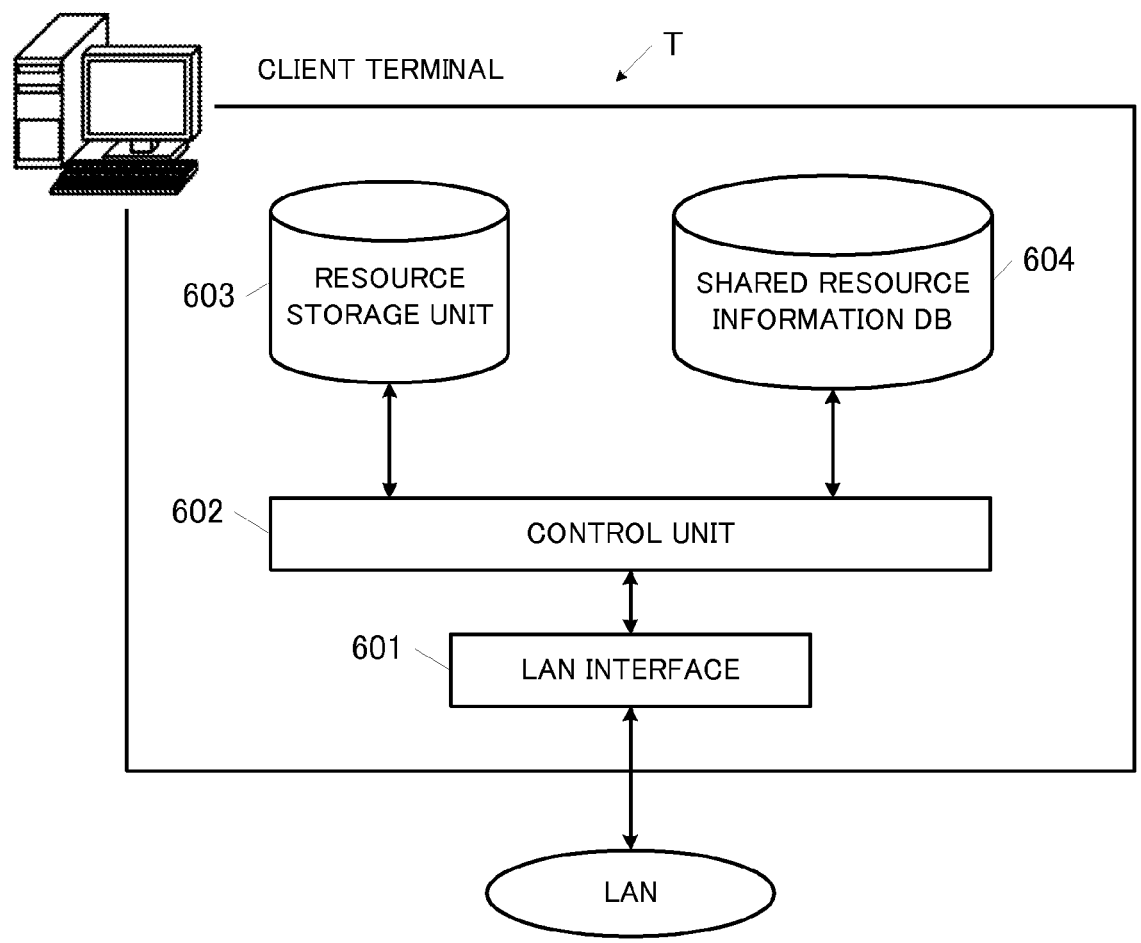
FIG. 3 is a functional block diagram of a client terminal.

The client terminal T will be described with reference to FIG. 3. FIG. 3 is a functional block diagram of the client terminal T.

The client terminal T is a terminal that can be directly operated by the user, and includes a personal computer (PC) and other similar devices used by the user on a daily basis. A great number of client terminals T typically exist in the LAN. However, in the present preferred embodiment, as illustrated in FIG. 1, a situation will be described in which client terminals 1A, 1B are connected to the LAN 1, client terminals 2A, 2B are connected to the LAN 2, client terminals 3A, 3B are connected to the LAN 3, and client terminals 4A, 4B are connected to the LAN 4, by way of example. A private IP address that is unique to a particular LAN is provided to each client terminal T.

As illustrated in FIG. 3, the client terminal T includes a LAN interface 601, a control unit 602, a resource storage unit 603, and a shared resource information database 604, as a main configuration.

The LAN interface 601 is an interface that performs communication with each device, such as the relay server R and the file server F connected to the same LAN, using the private IP address.

The resource storage unit 603 stores various resources such as files and folders to be used by the client terminal T.

The shared resource information database 604 stores shared resource information in each client terminal T and shared resource information in which key information regarding the relevant shared resource is provided.

The control unit 602 is a processing unit that controls various communications performed through the LAN interface 601. The control unit 602 controls communication processes complying with protocols such as TCP/IP, UDP, and SIP.

For example, the control unit 602 executes a process of controlling movement, change, deletion and other functions of the resources stored in the resource storage unit 603. The control unit 602 also performs a process of updating the shared resource information stored in the shared resource information database 604 when a change notification of the shared resource information is received from the relay server R. The details of the functions of each client terminal T centering on the control unit 602 will be described later.

Figure 4:
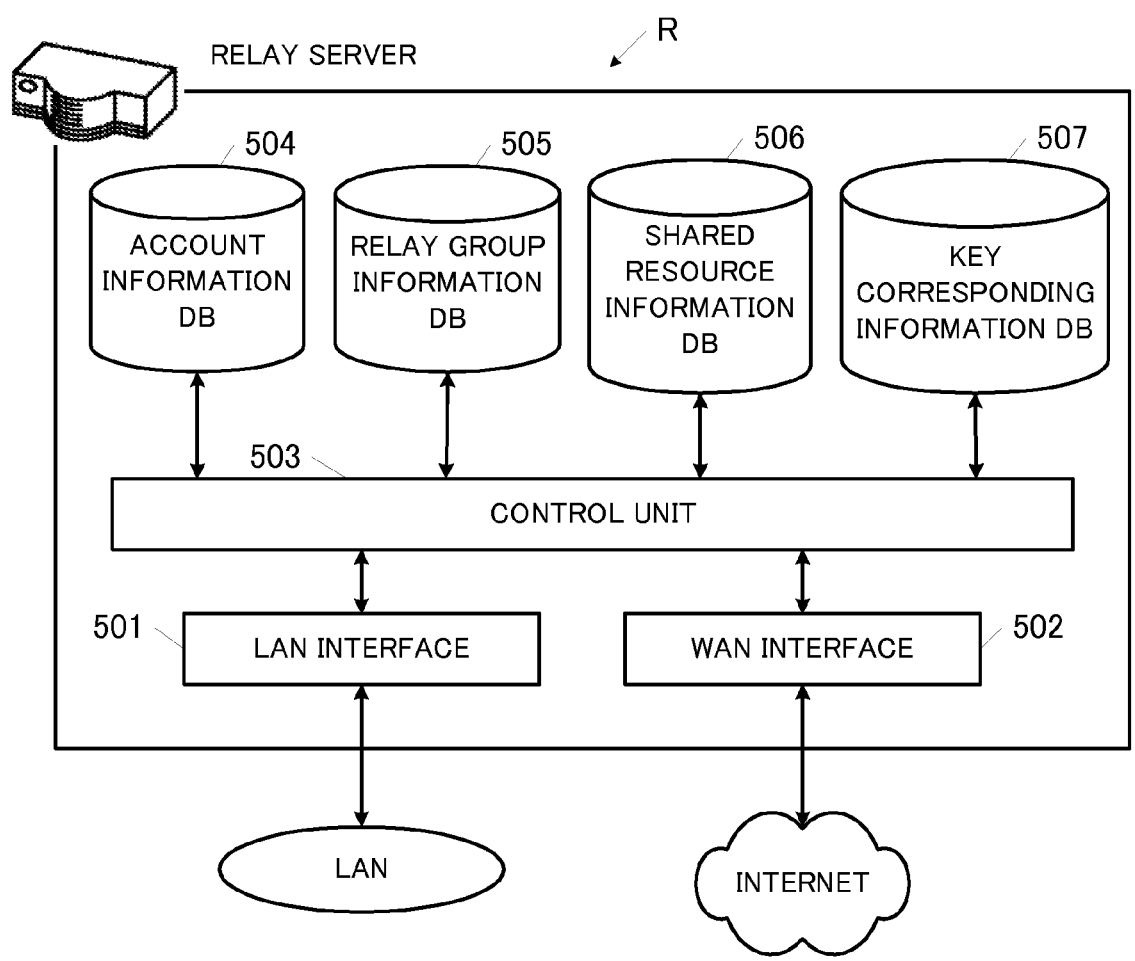
FIG. 4 is a functional block diagram of a relay server.

The relay server R will now be described with reference to FIG. 4. FIG. 4 is a functional block diagram of each relay server R.

As illustrated in FIG. 1, one relay server R is arranged in each LAN. Specifically, a relay server R1 is arranged in the LAN 1, a relay server R2 is arranged in the LAN 2, a relay server R3 is arranged in the LAN 3, and a relay server R4 is arranged in the LAN 4.

The relay server R is connected to the LAN, and can communicate with each client terminal T connected to the same LAN. The relay server R is also connected to the Internet, and can communicate with the relay servers R connected to the other LANs through the external server S. For such communication, both the private IP address and the global IP address are provided to each relay server R.

As illustrated in FIG. 4, the relay server R includes a LAN interface 501, a WAN interface 502, a control unit 503, an account information database 504, a relay group information database 505, a shared resource information database 506, and a key corresponding information database 507, as a main configuration.

The LAN interface 501 performs communication with the client terminal T connected to the same LAN, using the private IP address. For example, the relay server R1 can communicate with each client terminal 1A, 1B by using the LAN interface 501 in the LAN 1.

The WAN interface 502 performs communication with each device such as the external server S connected to the Internet, using the global IP address.

Each relay server R functions as the SIP registrar server and the communication between each relay server R and each client terminal T is performed using the SIP. For example, the relay server R2 functions as the SIP registrar server in the LAN 2, receives the account of each client terminal 2A, 2B connected to the LAN 2, and registers the account in the account information database 504.

Figure 5:
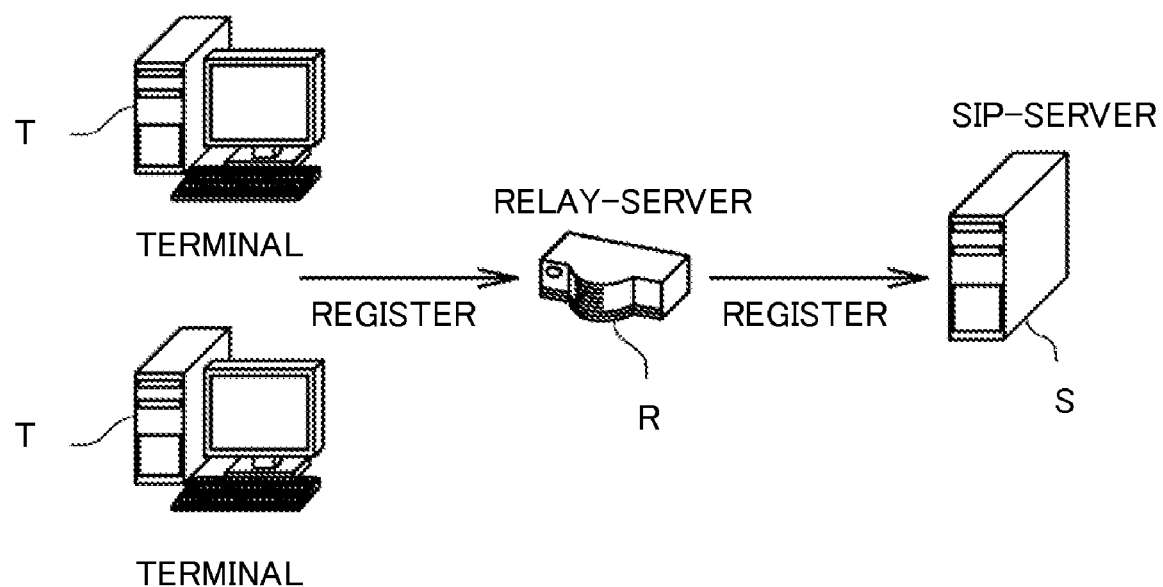
FIG. 5 illustrates the relationship of the client terminal, the relay server, and the external server.

As illustrated in FIG. 5, in relation the client terminal T, the relay server R functions as a server that receives the account from the relevant client terminal T and registers (REGISTER) the received account. In relation to the external server S, the relay server R functions as a client that transmits the account to the external server S and registers (REGISTER) the transmitted account.

The account information database 504 in FIG. 4 manages the account of the client terminal T that has made a registration request, in association with the private IP address. In the account information database 504, the account of the client terminal T in another LAN is also registered in addition to the account of the client terminal T connected to the same LAN as the relevant relay server R.

The relay group information database 505 manages relay group information regarding the client terminal T registered in the account information database 504.

The shared resource information database 506 manages the shared resource information regarding the client terminal T registered in the account information database 504.

The key corresponding information database 507 manages keys required to be entered when the resource described in the shared resource information is accessed.

The control unit 503 is a processing unit that controls various communications performed through the LAN interface 501 and the WAN interface 502, and controls various communication processes complying with protocols such as TCP/IP, UDP, and SIP.

For example, the control unit 503 executes a process of transmitting the account thereof to the external server S and requesting registration thereof, a process of creating the relay group information to store in the relay group information database 505, and a process of creating the shared resource information to store in the shared resource information database 506. The details of each function of the relay server R and the control unit 503 will be described later.

The file server F will now be described. As illustrated in FIG. 1, the file server F is connected to the LAN, and can communicate with each client terminal T connected to the same LAN.

The file server F is configured to store the various resources such as files and folders, and functions as a resource storage unit alternative to the resource storage unit 603 (FIG. 3) arranged in each client terminal T. In other words, in the present preferred embodiment, the resource that can be used by each client terminal T may be stored in a local disc of the relevant client terminal T, and/or may be stored in the file server F which functions as a network drive. The file server F is not required in each LAN, and the installation thereof is omitted in the LANs 2 and 4 in the example of FIG. 1.

The relay group information and the shared resource information, which is information handled in the present relay communication system, will now be described.

First, the relay group information will be described with reference to FIG. 6. FIG. 6 illustrates an example of the content of the relay group information. As illustrated in FIG. 6, relay group information 100 stored in the relay group information database 505 includes one group identifying information 101 and information (relay account information) 102 on the relay server R that forms a relay group by enabling connection with one another.

The group identifying information 101 is information for identifying the relay group information 100, and is given a different ID each time the relay group information 100 is created, so as to be uniquely identified. Therefore, an operator can specify the relay group based on the group identifying information 101 and easily change a group configuration.

The relay account information 102 includes account information about each relay server R that forms the relay group by enabling connection with one another. The relay account information 102 is connected to the same LAN as each relay server R that forms the relay group, and includes the account information and other information about the client terminal T registered in the relay server R.

In the relay account information 102, a specific name given to the account of each relay server R is also provided so as to be easily identified by the user. For example, in relay account information 102a on the relay server R1 (relay-server 1), the account (relay-server1@net) of the relay server R1 and a name (branch office A) given to the account are described.

In the relay account information 102, the specific name given to the account is also described in a portion of the account of the client terminal T connected to the same LAN as the relay server R, so as to be easily identified by the user. For example, in the client terminal (terminal 1A), a name (terminal 1A) given to the account (for example, user1A@relay-server1.net) is described. Further, division identifying data 103 indicating a division to which the client terminal T belongs, such as a sales division and a development division, is also described in the account of the client terminal T.

As described above, the relay group information 100 is created to be uniquely identified with respect to each relay group. The relay group information 100 includes the account (relay account information 102) of each relay server R forming a group (relay group) by enabling connection with one another. Further, the relay account information 102 includes the account information about the client terminal T registered in and connected to the same LAN as the relay server R.

Accordingly, by referencing the relay group information 100, it is clear which LANs form the group, and which relay server R and client terminal Tare registered in the relevant LANs. The relay group information 100 is exchanged between each relay server R that forms the relay group.

The content of the shared resource information will now be described with reference to FIG. 7. FIG. 7 illustrates an example of shared resource information 120 stored in the shared resource information database 604 of the client terminal 1A. The same information is also stored in the shared resource information database 506 of the relay server R1 connected to the same LAN as the client terminal 1A.

The shared resource information 120 includes account identifying information 121 regarding the client terminal 1A, and individual shared resource information 122 regarding the client terminal 1A.

The shared resource information 120 is created regarding each client terminal T, and the account identifying information 121 is information for identifying the shared resource information.

The individual shared resource information 122 includes shared resource identifying information 123, family account information 124, family resource information 125, and other information.

The shared resource identifying information 123 is information for identifying the individual shared resource information 122, and has a different ID each time the individual shared resource information 122 is created, so as to be uniquely identified. The shared resource identifying information 123 includes an ID (e.g., 20061001150032user1A@relay-server1.net) associated with the client terminal T that has made a request to create the shared resource information 120, and a name (projectA) for facilitating identification thereof.

Thus, the user can specify the individual shared resource information 122 based on the shared resource identifying information 123 and easily edit the contents thereof.

The family resource information 125 is an aggregate of resource information 127 indicating resources such as files and folders stored in the client terminal T. Each resource information 127 includes information (e.g., name="projectA-folder") about the name of the shared resource, account information (e.g., owner="user1A@relay-server1.net") about the client terminal T (owner client terminal) capable of operating the relevant resource, information (e.g., value="c:/folderA") about an address indicating the location of the resource, and other relevant information.

Key information 130 regarding the key required to be entered in order to access the resource is described in the family resource information 125. For example, in the example of the shared resource information 120 in FIG. 7, the key information 130, key="key0001", is described regarding the shared resource "file001.xls".

The family account information 124 is an aggregate of information about the account (e.g., user1A@relay-server1.net) of the client terminal T that shares the resource indicated in the family resource information 125. The family account information 124 includes information about the owner client terminal T and information about the client terminal T (user client terminal) capable of indirectly accessing the resource through the owner client terminal T. The user client terminal T cannot directly access the resource, but can indirectly access the resource through the owner client terminal T.

As described above, the shared resource information database 506 included in the relay server R is configured to store the shared resource information 120 (FIG. 7) including the family resource information 125 describing the resource information and the family account information 124 describing the account of the client terminal T that shares the resource. Moreover, the shared resource information 120 is configured to provide the key information 130 in a portion of the resource information 127, in association with the individual resource described in the family resource information 125.

Figure 8:
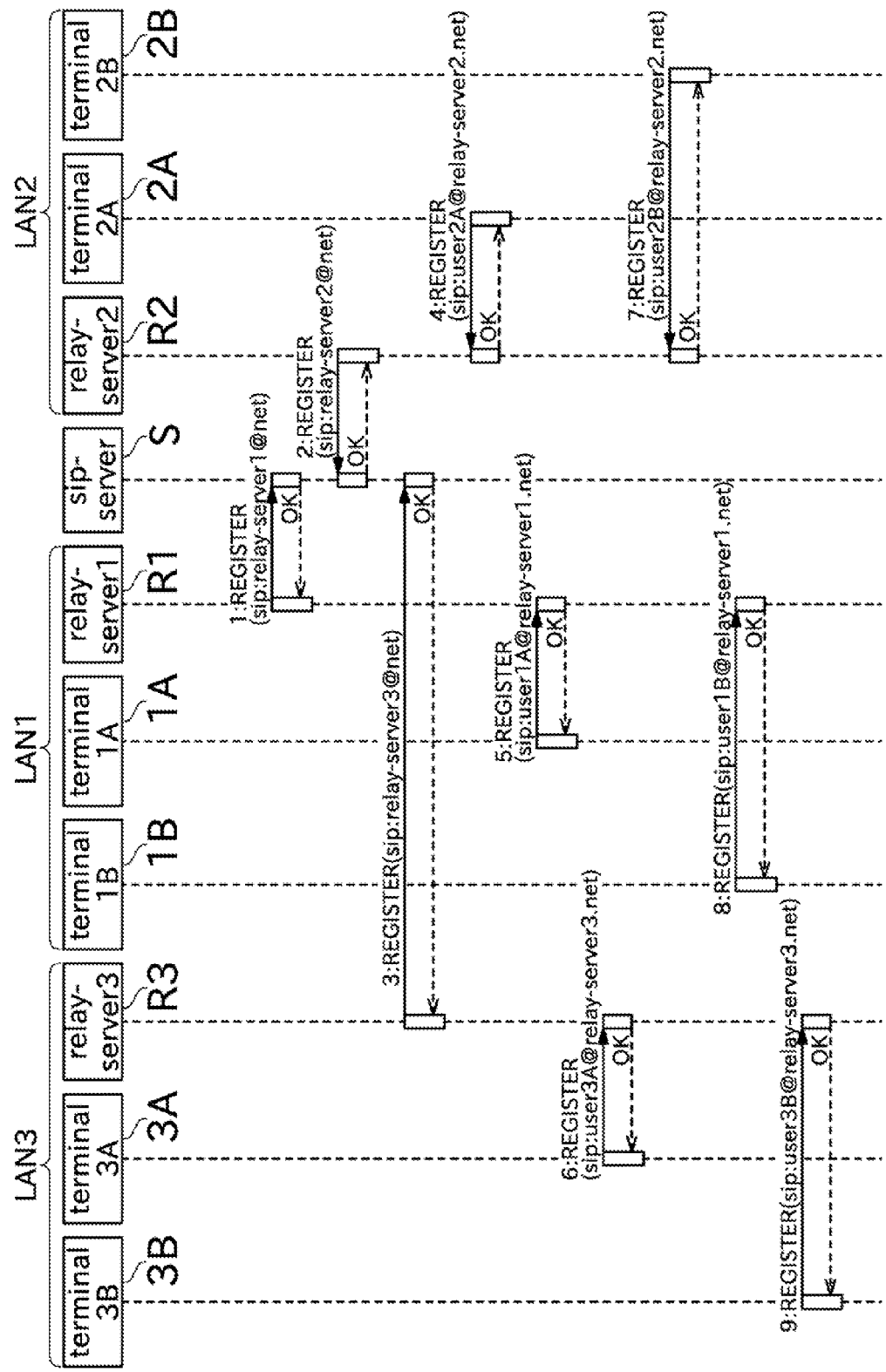
FIG. 8 is a sequence chart illustrating a communication process for registering the relay server and the client terminal.

The flow of a communication process in the relay communication system configured as described above will be described below with reference to the sequence chart of FIG. 8. The sequence numbers 1 through 9 illustrated in FIG. 8 indicate registration stages of the account of each device.

In sequence number 1, the relay server R1 transmits a registration request (REGISTER) of the account to the external server S. Here, the relay server R1 makes a request for registration of the account thereof (sip: relay-server1@net). The external server S returns an OK response to the relay server R1, and registers the account of the relay server R1 and the global IP address of the relay server R1 in the relay server account information database 203.

Similarly, the relay servers R2 and R3 make a registration request (REGISTER) of the accounts thereof to the external server S to register the account in the external server S (sequence numbers 2, 3).

In sequence number 4, the client terminal 2A transmits a registration request (REGISTER) of the account thereof to the relay server R2. Here, the client terminal 2A makes a request for registration of the account thereof (sip: user2A@relay-server2.net) The relay server R2 returns an OK response, and registers the account and the private address of the client terminal 2A in the account information database 504.

Similarly, the client terminals 1A, 3A, 2B, 1B, and 3B make a request for registration of the account to the respective relay servers R to register the account in the relay server R (sequence numbers 5 through 9).

The registration of the account of each relay server R in the external server S and the registration of the account of each client terminal T in the relay server R are completed through the above-described processes. The sequence described above is an example, and the order thereof may be arbitrarily set as long as the registration of the account of each device is completed as a result thereof.

Even the relay server R and the client terminal T existing on the network cannot participate in the relay communication system of the present preferred embodiment unless the account thereof is registered. For example, the relay server R4 and the client terminals 4A, 4B of FIG. 1 cannot participate in the communication described below because the account registration thereof is not performed in the process of FIG. 8.

Figure 9:
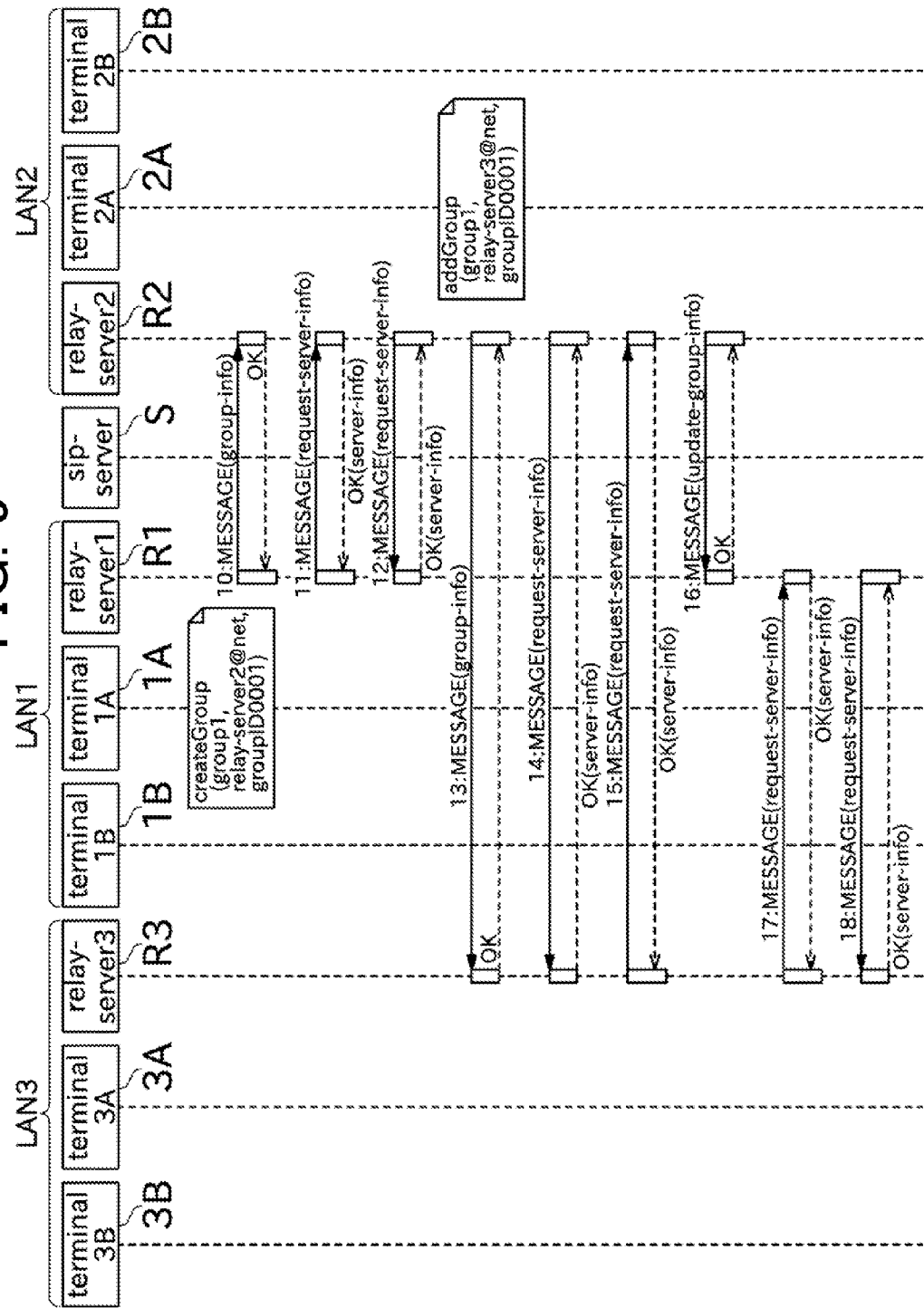
FIG. 9 is a sequence chart illustrating a communication process for providing a relay group with three relay servers.

The generation and registration stages of the relay group will now be described with reference to sequence numbers 10 through 18 of FIG. 9. The processes of sequence numbers 1 through 18 illustrated in FIGS. 8 and 9 are generally performed as initial settings of the network by the user or the operator.

First, in the relay server R1, a METHOD (createGroup METHOD) for forming a new relay group with the relay server R2 is executed by the operator. In the createGroup METHOD, a group name (group1), the account (relay-server2@net) of the relay server R2 with which the relay group is formed, and an identification ID (groupID0001) given to the newly created relay group are specified.

A message transmission command (MESSAGE METHOD) is then executed in the relay server R1, and a group-info message with respect to the relay server R2 is transmitted to the external server S (sequence number 10). This message includes the group name, the identification ID of the relay group, and other information specified in the createGroup METHOD.

In this MESSAGE METHOD, the account (sip: relay-server2@net) of the relay server R2 of a message transmission destination is specified. The external server S acquires the global IP address of the relay server R2 by referencing the relay server account information database 203, and relays the group-info message from the relay server R1 to the relay server R2. Having received the message, the relay server R2 returns an OK response to the relay server R1 through the external server S.

The communication between each relay server R of the present preferred embodiment is performed through the external server S, and is the same in the following description. Therefore, a specific description of the communication process through the external server S will be omitted in the following description.

The relay server R1 then transmits a transmission request message (request-server-info message) about server information to the relay server R2 (sequence number 11). Having received the message, the relay server R2 returns the information (server-info) thereof to the relay server R1 along with an OK response.

On the other hand, the relay server R2 transmits a request-server-info message to the relay server R1 (sequence number 12), and the relay server R1 returns the information (server-info) thereof to the relay server R2.

Through the exchange of the information on the respective servers performed in the above-described manner, the relay group information 100 indicating that the relay servers R1, R2 have formed the relay group is generated and stored in the relay group information database 505 of each relay server R1, R2.

Next, in the relay server R2, a METHOD (addGroup METHOD) to add the new relay server R3 to the previously created relay group (relay group formed with the relay servers R1, R2) is executed by the operator. In the addGroup METHOD, the group name (group1) of the relay group to be added to, the account (relay-server3@net) of the relay server R3 to be added, and the identification ID (groupID0001) of the relay group to be added to are specified.

Then, the relay server R2 transmits a group-info message to the relay server R3 to be added (sequence number 13). This message includes the group name, the identification ID of the relay group, and other information specified in the addGroup METHOD. Having received the message, the relay server R3 returns an OK response to the relay server R2. The server information is exchanged between the relay server R2 and the relay server R3 (sequence numbers 14, 15) in a manner similar to the above-described sequence numbers 11 and 12.

The relay server R2 transmits an update-group-info message to the relay server R1, which provides notification that the relay server R3 has been added to the relay group (sequence number 16). Having received the message, the relay server R1 returns an OK response to the relay server R2. Then, the server information is exchanged between the relay server R3 and the relay server R1 (sequence numbers 17, 18).

The relay group information 100 (specifically, the information regarding the contents illustrated in FIG. 6) indicating that the three relay servers R1, R2, and R3 forming the relay group is stored in the relay group information database 505 of each relay server R1, R2, and R3.

Next, an operation of actually sharing the resource of the client terminal T will be described with reference to FIG. 10. Here, an example will be described in which a folder "folderA" stored in the client terminal 1A and files "file001.xls" and "file002.doc" stored in the file server F of the LAN 1 are shared with the client terminals 2A and 3A, and the key for the file "file001.xls" is set.

The user operates the client terminal 1A and instructs the client terminal 1A to display a list of client terminals that can share the files with the client terminal 1A. Accordingly, the client terminal 1A references the stored content (relay group information 100) of the relay group information database 505 to display on a screen the list of client terminals T that are connected to the LAN to which any of the relay servers R forming the relay group with the relay server R1 is connected.

Here, the five client terminals 1B, 2A, 2B, 3A, and 3B are displayed as the terminals that can share the files, based on the contents of the relay group information 100 of FIG. 6. The user can specify the client terminal (the user client terminal) from the displayed five terminals with which to share the resource. In this example, the user specifies the client terminals 2A and 3A with which to share the files.

Figure 10:
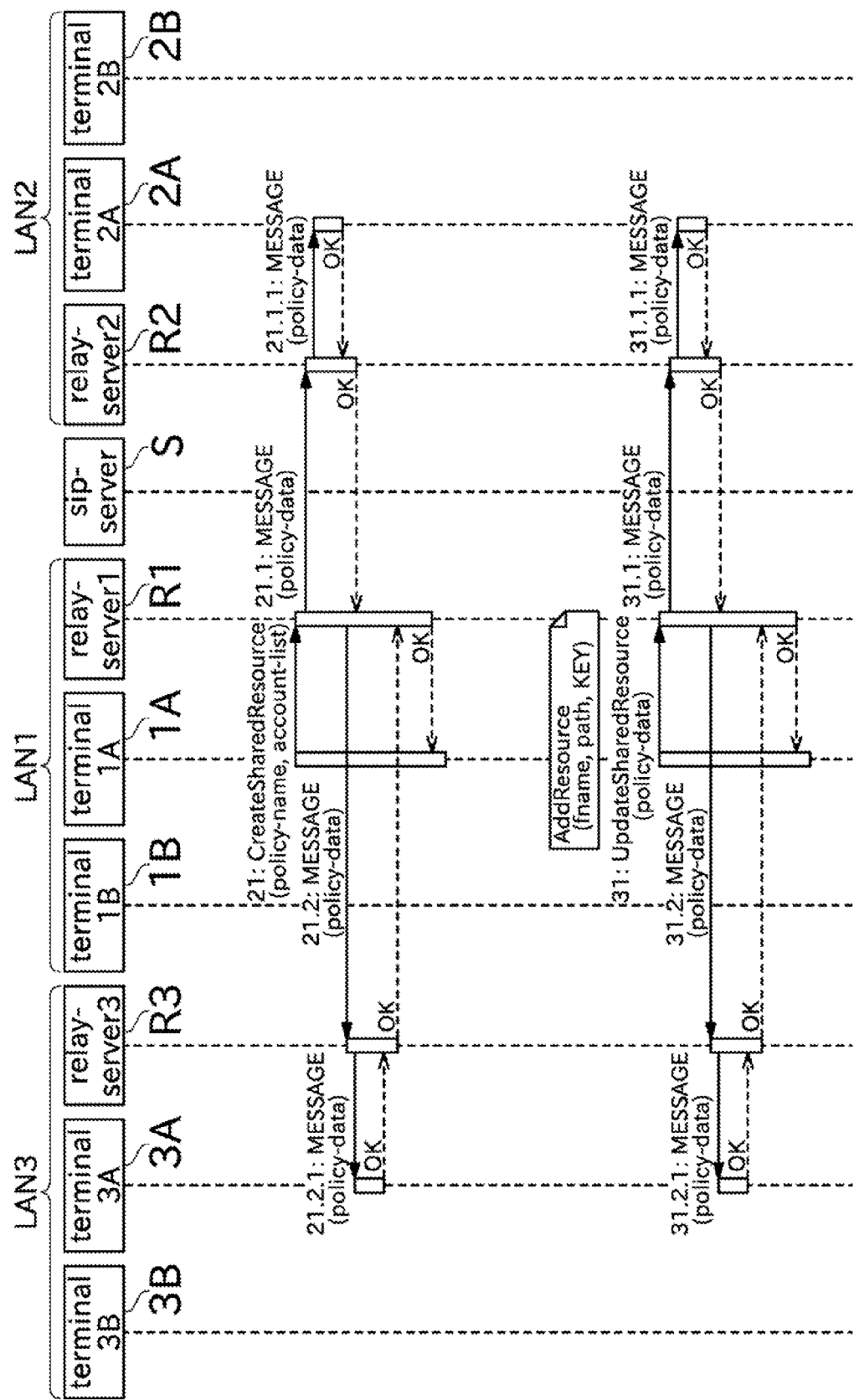
FIG. 10 is a sequence chart illustrating a communication process for registering a shared resource in the relay group.

The client terminal 1A then transmits a request to create the shared resource (CreateSharedResource command) to the relay server R1 (sequence number 21 of FIG. 10). This message includes the group identifying information 101 and the information about the specified user client terminals 2A and 3A.

Having received the command, the relay server R1 creates the shared resource information 120 to store in the shared resource information database 506. The relay server R1 references the contents of the relay group information database 505 based on the identifying ID of the relay group, transmits a policy-data message to the other relay servers R2, R3 forming the relay group, and notifies the other relay servers R2, R3 of the created shared resource information 120 (sequence numbers 21.1, 21.2).

Having received the message, each relay server R2, R3 stores the shared resource information 120 in the shared resource information database 506 therein, transmits the policy-data message to each specified user client terminal 2A, 3A, and notifies each specified user client terminal 2A, 3A of the shared resource information 120 (sequence numbers 21.1.1, 21.2.1). Having received the message, each user client terminal 2A, 3A changes the shared resource information 120 stored in the shared resource information database 604 therein, and returns an OK response to the relay servers R2, R3 of the transmission source. Having received the OK response, the relay servers R2, R3 return an OK response to the relay server R1, and having received the OK response, the relay server R1 returns an OK response to the client terminal 1A.

Thus, the shared resource identifying information 123 and the family account information 124 have been described in the shared resource information 120 stored in the shared resource information database 506 of the relay servers R1, R2, and R3. The same content is also described in the shared resource information 120 stored in the shared resource information database 604 of the client terminals 1A, 2A, and 3A.

When the user operates the client terminal 1A and executes the addResource METHOD, a process is performed in which the resource information (reference numeral 127 of FIG. 8) indicating the resource to be shared is added to the shared resource information 120.

In the present description, it is assumed that specification is made to select "folderA" from the resources stored in the resource storage unit 603 of the client terminal 1A, to select "file001.xls" and "file002.doc" from the resources stored in the file server F, and to share the selected folder and files with the other client terminals 2A, 3A.

When sharing the folder and files, "projectA-folder", "file00ZX.xls", and "file00ZY.doc" are respectively provided as file names to the "folderA", "file001.xls", and "file002.doc". Further, the user specifies a key "pa01" for the file "file001.xls".

The client terminal 1A, on which the user has performed the above-described operations, changes the content of the shared resource information 120 stored in the shared resource information database 604, based on the specified content. As a result, as illustrated in FIG. 6, the resource information 127 regarding the "folderA", "file001.xls", and "file002.doc" is described in the shared resource information 120. Moreover, as illustrated in FIG. 6, a key identifying index (key="key0001") is described as the key information 130 in the resource information 127 of "file001.xls".

Then, the client terminal 1A transmits a shared resource change request (UpdateSharedResource command) including the content of the changed shared resource information 120 to the relay server R1 (sequence number 31 of FIG. 10). The command includes the key "pa01" specified by the user.

Having received the resource change request, the relay server R1 stores the changed shared resource information in the shared resource information database 506 therein. Accordingly, the resource information 127 and the key information 130 have been described in the shared resource information 120 stored in the shared resource information database 506 of the relay server R1.

Further, the relay server creates key corresponding information associated with the key identifying index (key0001) and the actually specified key "pa01" to store in the key corresponding information database 507.

Then, the relay server R1 transmits a policy-data message to each relay server R2, R3 respectively connected to the user client terminals 2A, 3A, and notifies each relay server R2, R3 of the changed shared resource information 120 (sequence numbers 31.1, 31.2).

Having received the message, each relay server R2, R3 stores the shared resource information 120 in the shared resource information database 506 therein, transmits the policy-data message to each specified user client terminals 2A, 3A, and notifies each of specified user client terminals 2A, 3A of the shared resource information 120 (sequence numbers 31.1.1, 31.2.1).

Having received the message, each user client terminal 2A, 3A changes the shared resource information 120 stored in the shared resource information database 604 therein, and returns an OK response to the relay servers R2, R3 of the transmission source. Having received the OK response, the relay servers R2, R3 returns an OK response to the relay server R1, and having received the OK response, the relay server R1 returns an OK response to the client terminal 1A.

Thus, the operation of registering the resource is completed. The key corresponding information stored in the key corresponding information database 507 of the relay server R1 is properly exchanged with the other relay servers R2, R3 forming the group. The key identifying index (key0001) and the content of the key (pa01) are stored in the respective key corresponding information databases 507 of the relay servers R2, R3.

Figure 11:
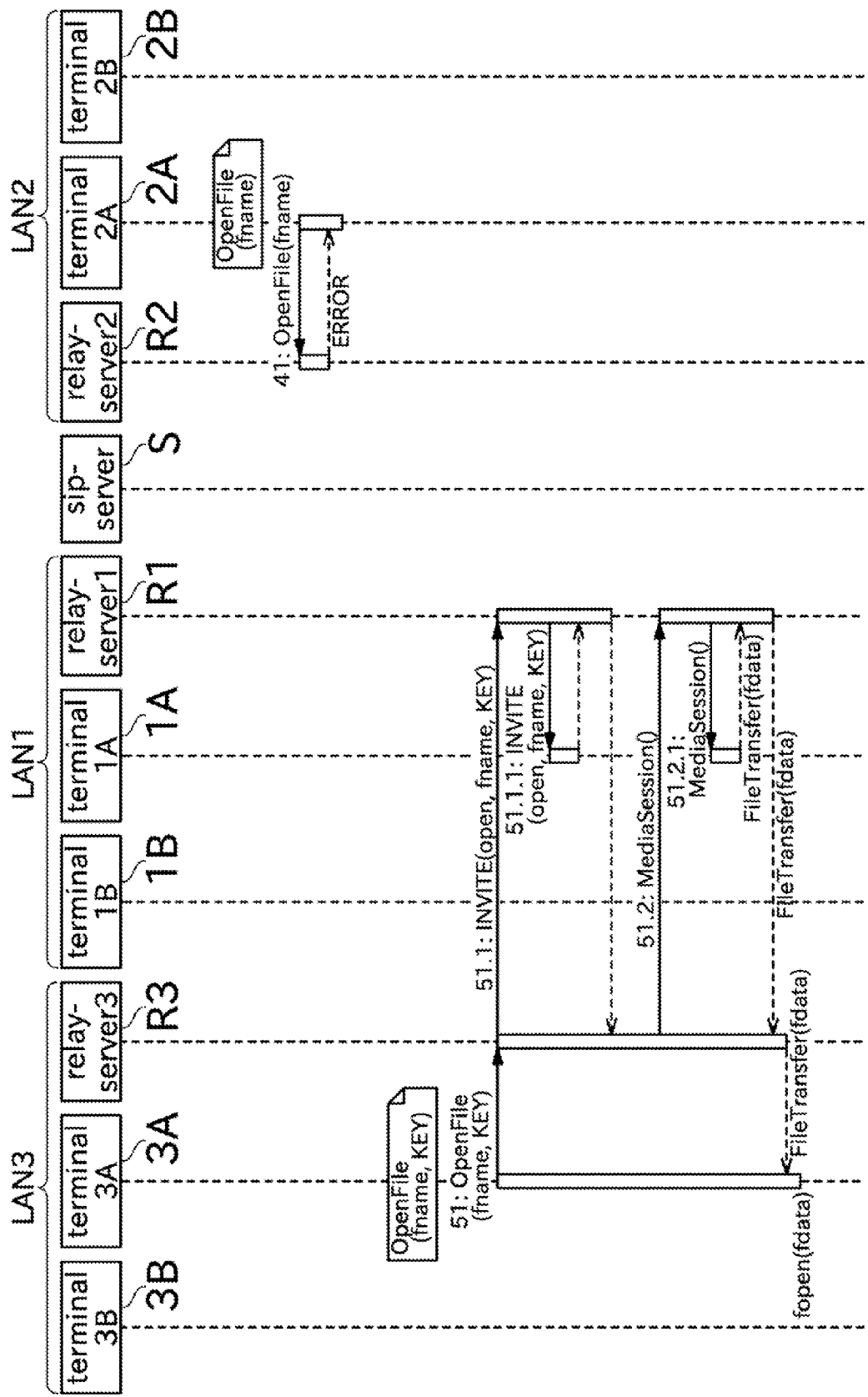
FIG. 11 is a sequence chart illustrating a communication process in which the shared resource held by the client terminal is opened by a client terminal in another Local Area Network (LAN).

Next, with reference to FIG. 11, a description of a communication process performed when the client terminals 2A and 3A open the resource shared as described above will be provided.

In sequence number 41 of FIG. 11, it is assumed that the user of the client terminal 2A wants to open the shared file "file00ZY.doc". The user launches the client software, and uses the screen illustrated on an upper side of FIG. 12.

Figure 12:
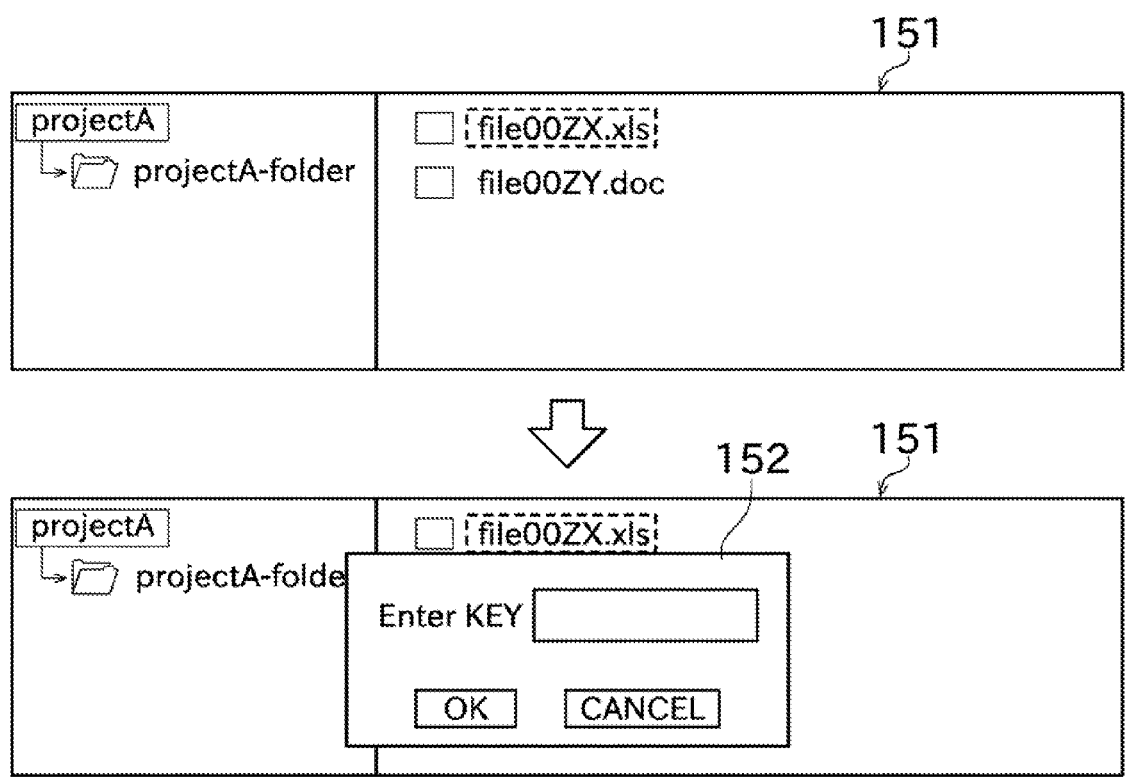
FIG. 12 is a diagram illustrating a state in which entry of a key by using client software executed by the client terminal is being prompted.

An example of the screen displayed when the client software is executed is illustrated on the upper side of FIG. 12. A window 151 displayed on the screen is divided into a right pane and a left pane. In the left pane, a folder showing the shared resource is displayed in a tree view. In the present description, since the folder "folderA" is shared under the name of "projectA-folder" (refer to the shared resource information 120 of FIG. 7), the shared folder is displayed under the name of "projectA-folder" on the client software.

In the right pane, the shared files in the shared folder are displayed in a view format. In the present description, as illustrated in FIG. 7, the file "file001.xls" is shared under the name of "file00ZX.xls", and the file "file002.doc" is shared under the name of "file00ZY.doc". Accordingly, as illustrated in FIG. 12, the two shared files "file00ZX.xls" and "file00ZY.doc" are displayed on the client software.

The user can select the shared file in the right pane to open the file by performing a proper operation. In this case, however, it is assumed that the user intends to open "file00ZY.doc", selects "file00ZX.xls" by an erroneous operation, and opens the erroneously selected file.

The client terminal 2A then references the shared resource information 120 stored in the shared resource information database 604, and checks whether or not the key information 130 is set for the file. In this case, it is determined that the key information 130 is set for the file "file00ZX.xls", based on the content of the shared resource information 120 of FIG. 7. Accordingly, as illustrated on a lower side of FIG. 12, the client terminal 2A displays a dialog box 152 on the screen, prompting the user to enter the key. However, it is assumed here that the user does not enter the key, and selects an OK button.

The client terminal 2A, on which the above-described operation has been performed, transmits an OpenFile METHOD for opening the file to the relay server R2 as illustrated in sequence number 41 of FIG. 11. In this METHOD, although the file "file00XZ.xls" to be opened is specified, the key is not entered, and thus, the key is not specified.

The relay server R2 then references the shared resource information 120 stored in the shared resource information database 506, and checks whether or not the key information 130 is set for the file. In this case, it is determined that the key information 130 is set for the file "file00ZX.xls". Accordingly, the relay server R2 references the key corresponding information database 507, and acquires the key content associated with the key information 130 to compare with the specified key.

In this case, since the key is not specified by the client terminal 2A, a mismatch is determined. Accordingly, the relay server R2 returns an error message to the client terminal 2A, and the client terminal 2A displays an error message on the screen. Thus, the user immediately notices that the user has been trying to open "file00ZX.xls" instead of "file00ZY.doc".

The situation has been described above in which the key is not entered at all in the client terminal 2A, however, the error is similarly returned in a situation in which an incorrect key is entered.

Next, in sequence number 51, it is assumed that the user of the client terminal 3A desires to open the shared file "file00ZX.xls". The user operates the client terminal 3A, performs an operation on the screen of the client software illustrated on the upper side of FIG. 12, selects "file00ZX.xls", and performs an opening operation.

As described above, the shared resource information 120 of the shared resource information database 604 indicates that the key information 130 is set for the file "file00ZX.xls". Accordingly, as illustrated on the lower side of FIG. 12, the client terminal 3A displays the dialog box 152 on the screen and prompts the user to enter the key.

The user enters the correct key "pa01" in the dialog box 152, and selects the OK button. As illustrated in sequence number 51 of FIG. 11, the client terminal 3A transmits the OpenFile METHOD for opening the file to the relay server R3. In this METHOD, the file "file00ZX.xls" to be opened and the specified key "pa01" are specified.

Then, the relay server R3 references the shared resource information 120 stored in the shared resource information database 506 and checks whether or not the key information 130 is set for the file. In this case, as illustrated in the content of the shared resource information 120 of FIG. 7, it is determined that the key information 130 (key0001) is set for the file "file00ZX.xls".

Accordingly, the relay server R3 references the key corresponding information database 507, and acquires the key content associated with the key information 130 to compare with the specified key. In the present description, the key associated with the key identifying index "key0001" is "pa01", and the key is matched with the specified key.

The relay server R3 then references the shared resource information database 506, and specifies the owner client terminal T of the file "file00ZX.xls". In this case, based on the content of the shared resource information 120 of FIG. 7, it is determined that the owner client terminal of "file00ZX.xls" is the terminal 1A. Next, the relay server R3 references the relay group information database 505, and specifies the relay server R that is connected to the same LAN as the owner client terminal 1A. In this case, based on the content of the relay group information 100, it is determined that the relay server in the same LAN as the owner client terminal 1A is the server R1.

Accordingly, the relay server R3 transmits a connection request (INVITE METHOD) to the relay server R1 (sequence number 51.1 of FIG. 11). The INVITE METHOD includes an indication of a file opening operation, a relevant file name, and key specification. Having received the connection request, the relay server R1 similarly transmits the INVITE METHOD to the client terminal 1A. When a response is returned from the client terminal 1A, the relay server R1 relays the response to the relay server R3.

The relay server R3 transmits a MediaSession command to the relay server R1 to establish a communication path between the relay servers R3 and R1 (sequence number 51.2). Then, the relay server R1 transmits the MediaSession command to the client terminal 1A to establish a communication path between the relay server R1 and the client terminal 1A (sequence number 51.2.1). The client terminal 1A executes a FileTransfer command, and transmits the content of the entity of the resource (the file "file001.xls") stored in the resource storage unit 603 to the relay server R1. The relay server R further relays the content to the relay server R3, and the relay server R3 relays the content to the client terminal 3A.

Then, a fopen METHOD is executed by the client terminal 3A so as to open the file "file00ZX.xls" by using a proper application.

An example has been described in FIG. 11 in which the operation of opening the file (resource) is performed. However, the relay operation of the relay server R performed when deleting the resource or updating the content, for example, is essentially similar to the above operation.

As described above, in the present preferred embodiment, when the operation instruction regarding the resource that can be operated by the client terminal T connected to the other LAN is received from the client terminal T stored in the account information database 504, the relay server R connected to the LAN relays the operation instruction regarding the resource to the other relay server R based on the relay group information 100.

The key information 130 can be described in association with the shared resource, in the shared resource information 120 stored in the shared resource information database 506 of the relay server R. When the key information 130 is described in the resource in the shared resource information 120, the operation instruction regarding the resource is relayed under the condition that the client terminal T that is giving the operation instruction has entered the correct key. For example, when the instruction to open the resource "file001.xls", which can be operated by the client terminal 1A in the other LAN, is received from the client terminal 3A, the relay server R3 relays the instruction for opening the file to the other relay server R1 as illustrated in sequence number 51.1 of FIG. 11 on the condition that the correct key "pa01" has been specified by the client terminal 3A, which has given the instruction.

Thus, even when the client terminal T is connected to a different LAN, the resource can be shared and/or used. Moreover, for example, by setting a different key for each resource, erroneous operations due to mishandling of the files can be prevented in advance, thereby providing highly-convenient resource sharing. In addition, regardless of a file format of the resource, the key can be set. Therefore, the erroneous operations of the files can be reliably prevented.

In the present preferred embodiment, when an incorrect key is entered in the client terminal that is giving the operation instruction, the error is returned to the client terminal.

Thus, the user can immediately notice the erroneous operation, thereby improving the convenience of resource sharing.

The preferred embodiment of the present invention has been described above. However, the above-described configuration may be modified as described below, for example.

The client software executed by the client terminal T is not limited to displaying the screen illustrated in FIG. 12, but can adopt various other user interfaces.

The relay server R for forming the relay group can be arbitrarily selected. A plurality of relay groups may be formed and stored in the relay group information database 505.

When performing the relay between different LANs as in the preferred embodiment described above, any suitable number of LANs may be provided and is not limited to four. Similar network other than the Internet may be used as the WAN.

A protocol other than the SIP may be used for the communication protocol between the external server S and each relay server R in the WAN, and between the relay server R and the client terminal T etc. in the LAN.

The external server S may be omitted, and communication may be directly performed between the relay servers R. In particular, if a protocol other than the SIP is used between the relay servers R, the communication between the relay servers R may be directly controlled based on the protocol, and thus the external server S can be easily omitted. The external server S is not limited to a single server, and may include two or more servers.

The WAN interface 502 of the relay server R may be omitted. In such a case, the connection with the Internet is performed using a router, and the relay server R may be arranged thereunder.

In the preferred embodiment described above, the client terminal T connected to the same LAN as the relay server R is stored in the account information database 504 of the relay server R. However, it is not limited to the above-described preferred embodiment, and a client terminal T connected to a LAN different from the relay server R may be stored in the account information database 504. Furthermore, the relay server R and the client terminal T registered in the account information database 504 of the relay server R may be connected in any manner as they can communicate with each other through the network.

A plurality of relay servers R may be connected to the same LAN. For example, three relay servers R may be provided in the same LAN, some client terminals T in the LAN may be stored in the account information database 504 of the first relay server R, and some of the other client terminals T may be stored in the account information database 504 of the second relay server R. In this case, the three relay servers R communicate through the LAN, and the relay is completed within one LAN.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A relay server device which is connected to a LAN and which can communicate via a WAN with a different relay server device connected to a different LAN, the relay server device comprising:
    a non-transitory memory comprising:
    an account information registering database arranged to store account information about a client terminal;
    a relay group information registering database arranged to store relay group information including account information of:
        the relay server device;
        the different relay server device;
        a client terminal connected to the relay server device via the LAN; and
        a different client terminal connected to the different relay server device via the different LAN;
    a relay group information sharing code arranged to share the relay group information with the relay server device and the different relay server device; and
    a shared resource information registering database arranged to store, when a resource is shared between the client terminal and the different client terminal in a relay group, shared resource information including:
        account information of a client terminal capable of handling the resource;
        information regarding the name of the resource;
        account information of a client terminal with access to the resource; and
        key information including a key that is required to be entered in order to access the resource; wherein
    the relay server device is configured such that when the relay server device receives an operation instruction regarding the resource, the relay server device:
        extracts the client terminal capable of handling the resource based on the shared resource information;
        identifies a relay server device connected to the client terminal capable of handling the resource; and
        relays the operation instruction regarding the resource via the identified relay server device only if the operation instruction includes the required key.

2. The relay server device according to claim 1, wherein, when a client terminal specifies an incorrect key, an error is returned to the client terminal.

3. A relay communication system comprising:
    a plurality of relay server devices, each of the plurality of relay server devices is connected to a corresponding LAN and is arranged to communicate with others of the plurality of relay server devices via a WAN; and
    a plurality of client terminals, each of the plurality of client terminals is connected to a corresponding one of the plurality of relay server devices via one of the corresponding LANs; wherein
    each of the plurality of relay server devices includes:
        a relay group information registration database arranged to store information of a relay group including account information of:
            each of the plurality of relay server devices; and
            each of the plurality of client terminals including which one of plurality of the relay server devices each of the plurality of client terminals is connected to;
        a relay group information sharing code arranged to share the relay group information with the plurality of relay servers; and
        a shared resource information registering database arranged to store, when a resource is shared between the plurality client terminals in a relay group, shared resource information including:
            account information of a client terminal capable of handling the resource;
            information regarding the name of the resource;
            account information of a client terminal with access to the resource; and
            key information including a key that is required to be entered in order to access the resource; wherein
        the relay server device is configured such that when the relay server device receives an operation instruction regarding the resource, the relay server device:
            extracts the client terminal capable of handling the resource based on the shared resource information;
            identifies a relay server device connected to the client terminal capable of handling the resource; and
            relays the operation instruction regarding the resource via the identified relay server device only if the operation instruction includes the required key.

4. The relay communication system according to claim 3, wherein, when a client terminal specifies an incorrect key, an error is returned to the client terminal.

* * * * *